Sept. 10, 1929.  A. M. MALLUK  1,727,475
FUEL CONTROLLING MEANS FOR AUTOMOBILES
Filed Nov. 30, 1926  3 Sheets-Sheet 1
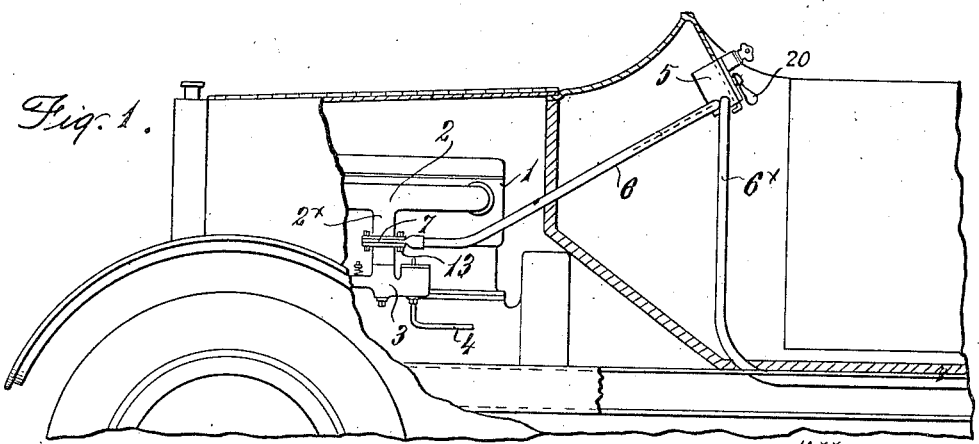
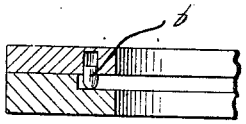
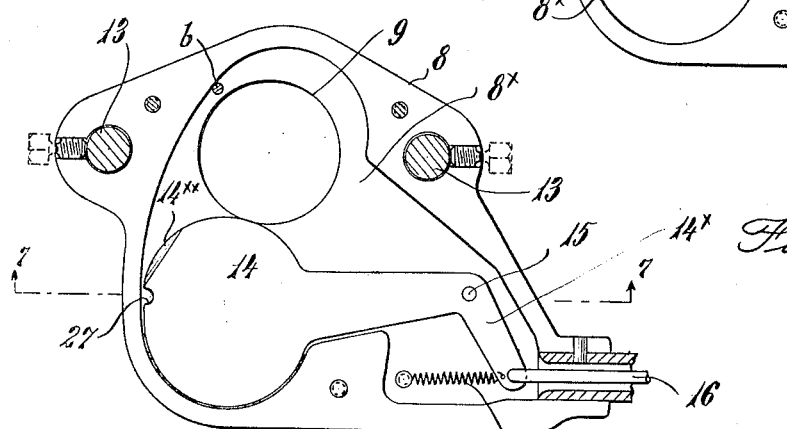
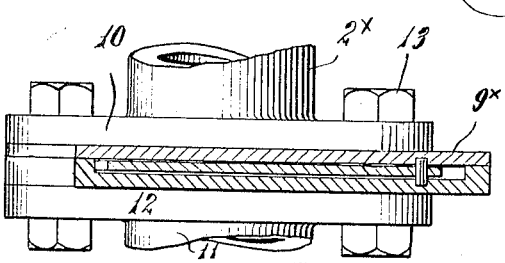
INVENTOR
ASSAD M. MALLUK
BY
ATTORNEY Sept. 10, 1929.  A. M. MALLUK  1,727,475
FUEL CONTROLLING MEANS FOR AUTOMOBILES
Filed Nov. 30, 1926   3 Sheets-Sheet 2
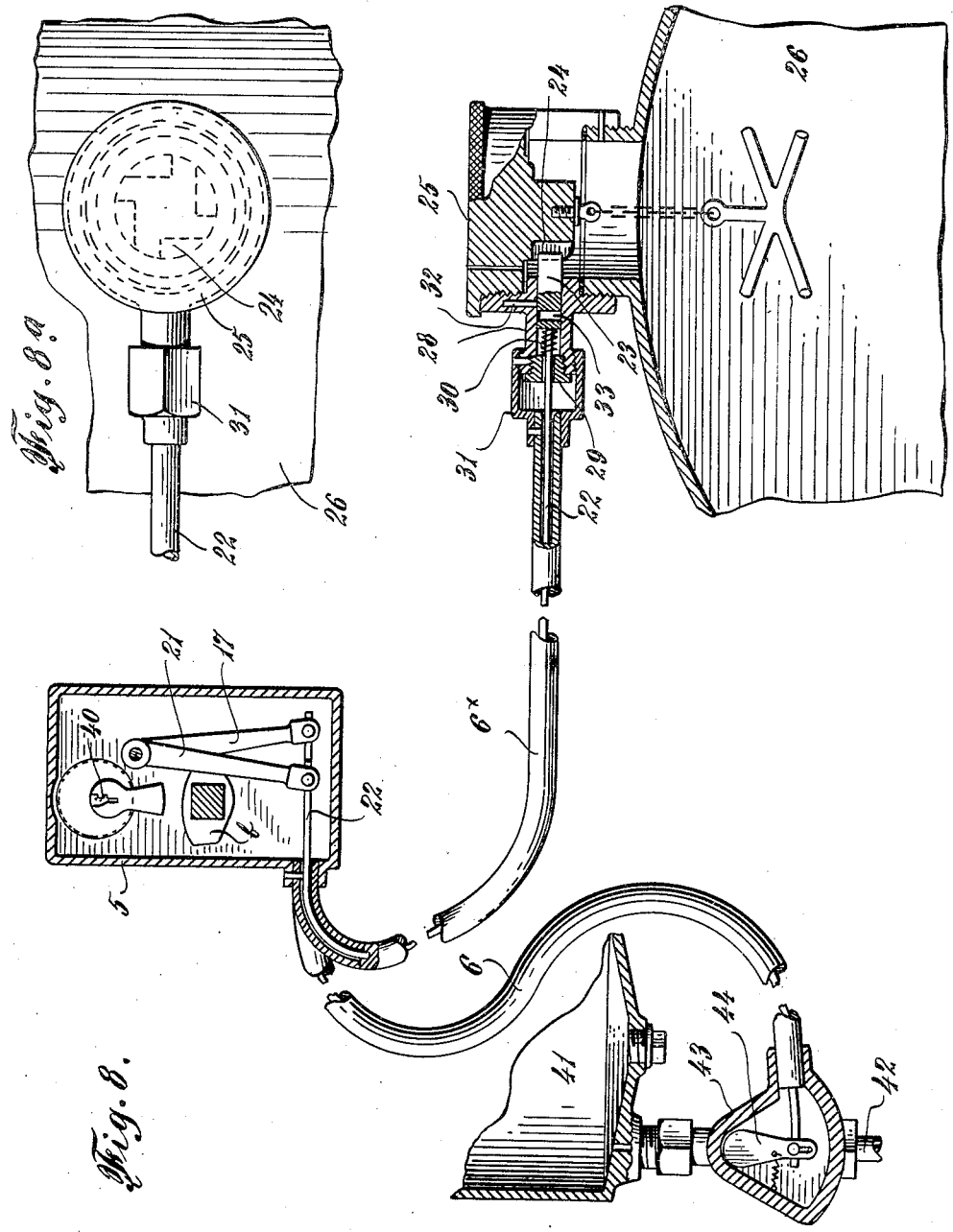
INVENTOR
Assad M. Malluk
BY
ATTORNEY Sept. 10, 1929.   A. M. MALLUK   1,727,475
FUEL CONTROLLING MEANS FOR AUTOMOBILES
Filed Nov. 30, 1926   3 Sheets-Sheet 3
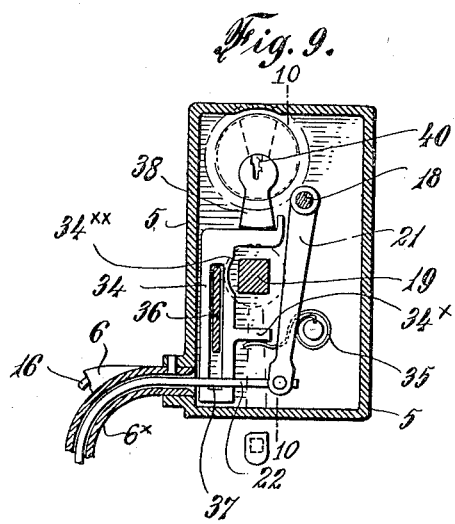
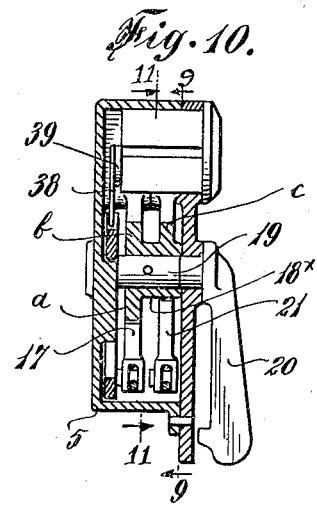
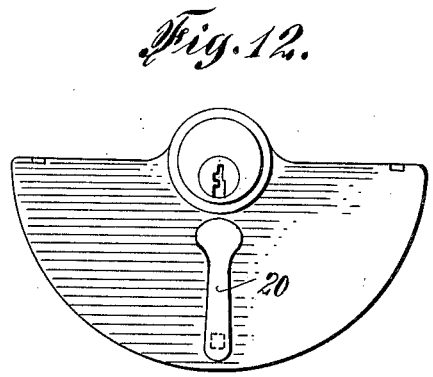
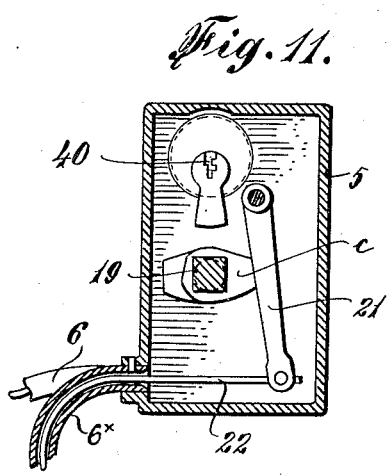
INVENTOR
Assad M. Malluk
BY
ATTORNEY Patented Sept. 10, 1929.

1,727,475

UNITED STATES PATENT OFFICE.

ASSAD M. MALLUK, OF NEW YORK, N. Y.

FUEL-CONTROLLING MEANS FOR AUTOMOBILES.

Application filed November 30, 1926. Serial No. 151,811.

The object of this invention is to provide means controllable from the dash-board of an automobile, or from some other support within reach of the driver, whereby the flow of the combustible mixture or raw fuel to the engine may be cut off, said means including locking mechanism whereby flow of the gases or raw fuel to the engine may be resumed upon unlocking the device. Such means is intended to supplant present locking devices which render inoperative either the steering mechanism, the ignition system, or rotation of the wheels.

The invention will be understood by reference to the accompanying drawings which show an embodiment of the invention, it being understood that various modifications may be made therein without departing from the spirit of the invention.

Figure 1 is a fragmentary sectional elevation of an automobile schematically showing the device;

Figure 2 is a plan view of the manifold shutter and its supporting means, the shutter being in closed position;

Figure 3 is a view similar to Figure 2 showing the shutter in open position;

Figures 4, 5 and 6 are sectional side elevations of the manifold shutter support showing the operation of the automatic retaining means for the shutter, operable when the actuating member is freed;

Figure 7 is a sectional side elevation of the manifold pipe, shutter support and shutter on the line 7—7, Figure 3;

Figure 8 is a sectional side elevation, largely diagrammatic, showing the controlling elements for the main fuel tank and the vacuum tank;

Figure 8$^a$ is a plan view of the cap on the main fuel tank;

Figure 9 is a sectional front elevation of the control box and its mechanism on the line 9—9, Figure 10, some parts being omitted;

Figure 10 is a vertical section on the line 10—10, Figure 9;

Figure 11 is a vertical sectional elevation on the line 11—11, Figure 10, some parts being omitted;

Figure 12 is an elevation of the box cap plate and operating lever.

Referring to the drawings, Figure 1 indicates the forward portion of an automobile, the engine being indicated at 1, the intake manifold at 2, the carburetor at 3, the carburetor feed pipe at 4. The control box is indicated at 5. From the control box a conduit 6 leads to the shutter support 7 intermediate the carburetor and the intake manifold. A second conduit 6$^x$ leads from the control box to the rear of the chassis for connection with the main fuel tank, as shown in Figure 8.

Any suitable means may be employed for shutting off the flow of gases from the carburetor to the manifold. In the present embodiment I employ a shutter support, the lower member of which is illustrated in detail in Figures 2 and 3. The shutter support comprises a shallow lower member 8 and a cap member 9$^x$ (Figure 7). Each member is formed with an opening for the passage of gases, the opening of one member being in register with the other, and the opening of the lower member being indicated at 9, Figures 2 and 3. The depending extension 2$^x$ of the manifold is formed with a flange 10 and the connecting pipe 11 for the carburetor is formed with a flange 12. The shutter support is placed intermediate flanges 10 and 12 and is bolted thereto by means of the bolts 13. Within chamber 8$^x$ of the shutter holder is a shutter 14 pivoted at 15 and having a lever arm 14$^x$ to which is connected a spring 15$^x$ tending to move the shutter into its closed position, as shown in Figure 2. The shutter is adapted to be moved into open position by means of a rod or cable 16 connected to the end of lever extension 14$^x$ and extending through conduit 6 to the control box 5.

Within the control box is a lever arm 17 pivotally mounted on a stud shaft 18. Lever arm 17 is adapted to be swung by means of a cam member 18$^x$ mounted on a shaft 19 which extends from end to end of the control box and has secured thereto an operating handle 20. Cam member 18$^x$ is provided with two cam projections for lever 17, these projections being indicated at $a$ and $b$, so that movement of the handle 20 to either the right or to the left from its neutral position will cause a movement of rod 16 and act to open the shutter 14, thus permitting the flow of gases from the carburetor to the engine.

Within the control box 5 and fixed to stud shaft 19 is a second lever 21, connected at its lower end to a rod 22, the latter passing through conduit 6ˣ and being connected at its other end to a dog 23 adapted to engage a shoulder 24 on cap 25 for the main fuel tank 26, when said cap is moved into closing position. Any suitable cap or plug for the filler opening of the tank may be employed, it only being necessary that the rod 22 be connected with some operative retaining device for the cap. Lever 21 is in line with a cam projection $c$ on cam member 18ˣ, which projection is in line with projection $b$. Thus movement of operating lever 20 in a predetermined direction will enable the springs to actuate levers 17 and 21, simultaneously closing shutter 14 intermediate the carburetor and the manifold and will lock the filler cap in position at the main supply tank, thus effectively stopping the running of the car.

If an attempt is made to open the manifold shutter by sawing through conduit 6 and manipulating rod 16, this will prove ineffectual for the following reasons:—

Rod 16, when moved to closing position for the shutter, does not permit the movement of the shutter to its maximum extent and does not completely release the tension of spring 15ˣ. Therefore, should conduit 6 be severed, rod 16 will be released, spring 15ˣ will move the shutter to its final position and thereby enable a pin $b$ to fall downward into a recess 27 formed in the margin of the shutter 14 thereby holding the same against movement in any direction. The lower end of pin $b$ is bevelled and this enables a bevelled face 14ˣˣ to engage and raise the pin when the shutter is moved from the open position shown in Figure 3 to closed position shown in Figures 2 and 5.

Should an attempt be made to remove the retaining dog from the filler cap by sawing through conduit 6ˣ this will be ineffectual for the following reasons:—

The filler cap housing is formed with an apertured extension 28, the rod passing through the aperture of the housing and through a small aperture formed in a plug 29. Surrounding the rod and having one end bearing against plug 29 and the opposite end against the dog 23 is a coil spring 30. Any suitable connection may be made intermediate housing extension 28 and conduit 6ˣ as, for example, the coupling 31. Reference to Figure 8 will show that when the dog 23 is in retaining position it has not moved to its maximum position, being held against such movement by rod 22. Should conduit 6ˣ be severed, rod 22 will be released and spring 30 will thereupon throw the dog to the right whereupon a pin 32 disposed within the cap housing will fall down into an aperture 33 formed in the dog, thereby preventing movement of the dog in any direction.

A key lock is provided for locking the handle 20 in position so that the rods 16 and 22 cannot be operated to open the shutter or to release the filler cap, thus affording a double insurance against unauthorized operation of the car or the theft of motor fuel from the tank. Such locking means is as follows:—

Within the control box 5, adjacent stud shaft 19, which shaft is squared, is a locking plate 34 which is normally maintained in upper position by means of a spring 35, the spring acting against an arm 34ˣ on the plate. The plate is guided in its movements by a guide projection 36 which passes within a vertical slot 37 formed in the plate. When the plate is in upper position handle 20 cannot be moved. When an attempt is made to rotate the handle, stud shaft 19 strikes the edge of the plate and cannot move farther. When the locking plate is moved to its lower position, as shown in Figure 9, the handle can be moved because of its being given clearance through the recessing of the wall of the plate as at 34ˣˣ. Locking plate 34 may be moved downward by any suitable means, controlled by a key, the means shown consisting of an arm 38 carried by a spindle 39, the spindle being controlled and rotated through a key, the key passing into a slot 40. The specific construction of the lock and its operating member for the locking plate forms no part of the present invention and does not require specific illustration or description, it being sufficient to provide any standard form of lock so arranged as to have a member adapted to depress the locking plate 34.

In some cases it may be desired to shut the fuel off from the vacuum tank. In Figure 8 I have indicated the vacuum tank at 41, and at 42 a pipe leading to the carburetor. Intermediate pipe 42 and the vacuum tank is a connecting box 43 and within the box is a valve member 44 of any suitable construction adapted to shut off the flow of fuel from the vacuum tank to pipe 42. Box 43 is connected with control box 5 by means of the pipe 6 which, in the other figures, is connected to the shutter support 7.

The improvements as described above will afford an ideal prevention against theft of automobiles and will lessen the cost of insurance by decreasing the risk of theft. Furthermore, the locking of the gas tank closure is a prevention against fire and also injury to the motor parts through the action of children or others in throwing dirt or other foreign substances into the tank.

Having described my invention what I claim and desire to secure by Letters Patent is as follows:—

1. Fuel controlling means for an automobile of a type including an internal combustion engine, an intake manifold and a fuel tank, comprising a control box adapted to be mounted on a dash-board, a manual operating device carried by the control box, a plurality of levers within the control box and adapted for selective actuation by the operating device, means connected to one of said levers and adapted to be connected to the engine intake manifold for closing the latter, and means connected to a second of said levers and adapted to be connected to the fuel tank closure for holding the same in closed position.

2. Fuel controlling means for an automobile of a type including an internal combustion engine, an intake manifold and a fuel tank, comprising a control box adapted to be mounted on a dash-board, a manual operating device carried by the control box, a plurality of levers within the control box and adapted for selective or simultaneous actuation by the operating device, means connected to one of said levers and adapted to be connected to the engine intake manifold for closing the latter, and means connected to a second of said levers and adapted to be connected to the fuel tank closure for holding the same in closed position.

3. In fuel controlling means for automobiles, means for controlling both the passage of fuel into the fuel tank and the passage of fuel from the tank to the intake manifold of the engine, comprising a closure at the fuel tank inlet, a closure intermediate the engine carburetor and the intake manifold, a holding device for each closure, a control box adapted to be mounted on the dash-board of an automobile and a manually operable lever having operative connections with said holding devices.

4. Fuel controlling means for automobiles comprising a control box adapted to be mounted on a dash-board, an operating handle carried by the control box, a plurality of levers within the box, means connected to one of said levers and adapted to be connected to the engine intake manifold for closing the latter, means connected to a second of said levers and adapted to be connected to a fuel tank closure for holding the same in closed position, a shaft adapted to be rotated by said handle, and means on said shaft for actuating the levers.

5. In devices of the character described, a control box adapted to be mounted on a dashboard, an operating handle carried by the control box, two levers within the box, means connected to one of said levers and adapted to be connected to an engine intake manifold for closing the latter, means connected to a second of said levers and adapted to be connected to a fuel tank closure for holding the same in closed position, a shaft adapted to be rotated by the operating handle, and means carried by the shaft for actuating one of the levers independently of the other and also for actuating the levers simultaneously.

6. A device constructed in accordinace with claim 1, in combination with means for automatically locking one tof said closures in closed position should its actuating element be severed from the control box, said means comprising a pin normally held against the action of gravity in the closure casing, a recess in an element of the closure device and a spring for moving said device beyond its normal position whereby the pin is permitted to fall into said recess.

In testimony whereof, I have signed my name to this specification.

ASSAD M. MALLUK.